United States Patent
Schwarz et al.

(10) Patent No.: US 9,506,353 B2
(45) Date of Patent: Nov. 29, 2016

(54) LIGHTWEIGHT SHROUDED FAN BLADE

(71) Applicant: United Technologies Corporation, Hartford, CT (US)

(72) Inventors: Frederick M. Schwarz, Glastonbury, CT (US); Michael A. Weisse, Tolland, CT (US); Steven H. Zysman, Amston, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 971 days.

(21) Appl. No.: 13/719,821

(22) Filed: Dec. 19, 2012

(65) Prior Publication Data
US 2014/0169935 A1 Jun. 19, 2014

(51) Int. Cl.
F01D 5/22 (2006.01)
F04D 29/32 (2006.01)
F04D 29/66 (2006.01)
F04D 25/02 (2006.01)

(52) U.S. Cl.
CPC ............ F01D 5/225 (2013.01); F04D 29/324 (2013.01); F04D 29/666 (2013.01); F04D 29/668 (2013.01); F04D 25/028 (2013.01); F05D 2220/36 (2013.01); F05D 2250/14 (2013.01); Y02T 50/671 (2013.01); Y02T 50/673 (2013.01)

(58) Field of Classification Search
CPC .............................. F01D 5/225; F04D 29/668
See application file for complete search history.

(56) References Cited

U.S. PATENT DOCUMENTS

| | | | |
|---|---|---|---|
| 2,472,886 A * | 6/1949 | Conrad | F01D 5/22 416/193 R |
| 2,772,854 A * | 12/1956 | Anxionnaz | F01D 5/22 416/190 |
| 2,912,157 A * | 11/1959 | Taylor | F01D 5/22 416/191 |
| 3,996,668 A | 12/1976 | Sharon | |
| 4,257,741 A | 3/1981 | Betts et al. | |
| 4,257,742 A | 3/1981 | Ogata et al. | |
| 4,734,010 A * | 3/1988 | Battig | F01D 5/22 416/190 |
| 4,798,519 A * | 1/1989 | Zipps | F01D 5/22 416/190 |
| 5,275,531 A * | 1/1994 | Roberts | F01D 5/143 415/173.1 |
| 5,460,488 A | 10/1995 | Spear et al. | |
| 5,562,419 A | 10/1996 | Crall et al. | |
| 5,695,323 A * | 12/1997 | Pfeifer | F01D 5/22 416/190 |
| 6,039,542 A | 3/2000 | Schilling et al. | |
| 6,071,077 A | 6/2000 | Rowlands | |
| 7,758,311 B2 | 7/2010 | Loehle et al. | |
| 8,021,113 B2 | 9/2011 | Routier | |
| 8,182,228 B2 | 5/2012 | Riley et al. | |
| 2010/0176119 A1 | 7/2010 | Ozbaysal et al. | |
| 2012/0222398 A1 | 9/2012 | Smith et al. | |

OTHER PUBLICATIONS

Rauch, D., "Design Study of an Air Pump and Integral Lift Engine ALF-504 Using the Lycoming 502 Core", NASA Report CR-120992, NASA Lewis Research Center, Cleveland, Ohio, 1972, pp. 1-182.*
International Preliminary Report on Patentability for PCT Application No. PCT/US2013/074847, mailed Jul. 2, 2015.
International Search Report and Written Opinion for PCT Application No. PCT/US2013/074847, mailed Sep. 25, 2014.

* cited by examiner

Primary Examiner — Craig Kim
Assistant Examiner — Jason Fountain
(74) Attorney, Agent, or Firm — Carlson, Gaskey & Olds, P.C.

(57) ABSTRACT

A gas turbine engine according to an exemplary aspect of the present disclosure includes, among other things, a fan section including a fan with a plurality of fan blades rotatable about an axis. Each of the plurality of fan blades includes a mid-span shroud and a speed change device in communication with the fan.

20 Claims, 3 Drawing Sheets

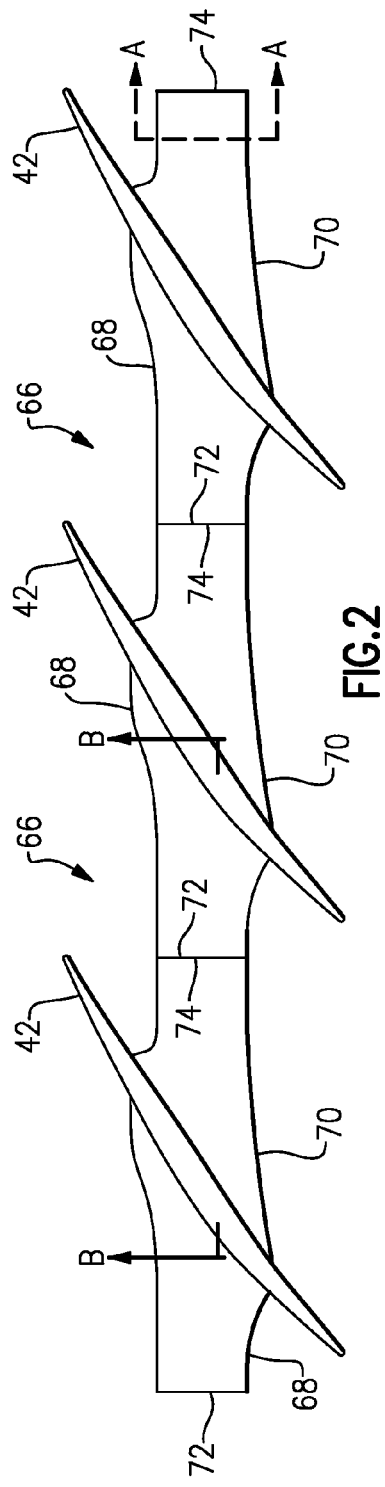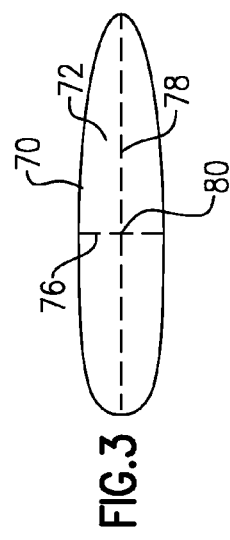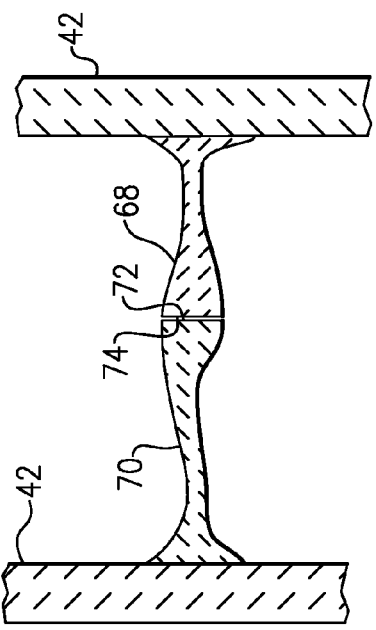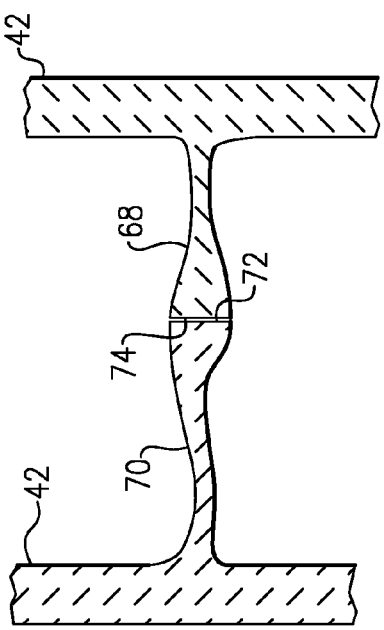

LIGHTWEIGHT SHROUDED FAN BLADE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section includes multiple airfoils disposed circumferentially about an engine longitudinal centerline axis. At certain aircraft operating conditions, these airfoils may experience self-induced oscillations, such as flutter. These self-induced oscillations may become severe enough to fracture the airfoil. One means of preventing such a fracture is to increase the chord width of the fan blades. However, this approach increases the overall weight of the engine and the rotating mass. Accordingly, it is desirable to develop an improved gas turbine engine design that will reduce flutter of the airfoils and decrease the weight of the engine.

SUMMARY

A gas turbine engine according to an exemplary aspect of the present disclosure includes, among other things, a fan section including a fan with a plurality of fan blades rotatable about an axis. Each of the plurality of fan blades includes a mid-span shroud and a speed change device in communication with the fan.

In a further non-limiting embodiment of the foregoing gas turbine engine, the speed change device includes a geared architecture driven by a turbine section for rotating the fan about the axis.

In a further non-limiting embodiment of either of the foregoing gas turbine engines, the mid-span shroud is spaced inwardly from opposing ends of the plurality of fan blades.

In a further non-limiting embodiment of any of the foregoing gas turbine engines, the mid-span shroud includes a first shroud member on a first side of each of the plurality of fan blades and a second shroud member on a second opposite side of each of the plurality of fan blades.

In a further non-limiting embodiment of any of the foregoing gas turbine engines, the mid-span shroud has an elliptical cross section.

In a further non-limiting embodiment of any of the foregoing gas turbine engines, the minor axis of the elliptical cross-section varies along the length of the mid-span shroud.

In a further non-limiting embodiment of any of the foregoing gas turbine engines, the major axis of the elliptical cross section is substantially constant along the length of the mid-span shroud.

In a further non-limiting embodiment of any of the foregoing gas turbine engines, a distance between a center of the elliptical cross-section and the axis varies along the length of the mid-span shroud.

In a further non-limiting embodiment of any of the foregoing gas turbine engines, the cross-sectional area of the mid-span shroud generally decreases between opposing ends of the mid-span shroud.

In a further non-limiting embodiment of any of the foregoing gas turbine engines, the gas turbine engine includes a low pressure turbine with at least three stages and no more than six stages.

In a further non-limiting embodiment of any of the foregoing gas turbine engines, the gas turbine engine includes a fixed area nozzle in communication with the fan section.

A fan blade for a gas turbine engine according to an exemplary aspect of the present disclosure includes, among other things, a fan blade with a mid-span shroud including a first shroud member on a first side of the fan blade and a second shroud member on a second side of the fan blade opposite from the first side. The first shroud member and the second shroud member have a portion with a reduced cross-sectional area.

In a further non-limiting embodiment of the foregoing fan blade, the first shroud member and the second shroud member have an elliptical cross section.

In a further non-limiting embodiment of either of the foregoing fan blades, the first shroud member and the second shroud member have an elliptical cross section with a minor axis that varies along the length of the first shroud member and the second shroud member.

In a further non-limiting embodiment of any of the foregoing fan blades, the first shroud member and the second shroud member have an elliptical cross section with a major axis that varies along the length of the first shroud member and the second shroud member.

In a further non-limiting embodiment of any of the foregoing fan blades, a distance between a center of the elliptical cross-section and the axis varies along the length of the mid-span shroud.

A method of operating a gas turbine engine according to another exemplary aspect of the present disclosure includes, among other things, an engine including a fan section. The fan section includes a plurality of fan blades connected by a mid-span shroud and a turbine section. The method comprising the steps of rotating the fan section including the mid-span shroud at a first speed and rotating a turbine section at a second speed. The first speed is different from the second speed.

In a further non-limiting embodiment of the foregoing method of operating a gas turbine engine, a speed change device is in mechanical communication with the fan section and the turbine section.

In a further non-limiting embodiment of either of the foregoing methods of operating a gas turbine engine, the mid-span shroud includes a first shroud member and a second shroud member. The first shroud member and the second shroud member have a portion with a reduced cross-sectional area.

In a further non-limiting embodiment of any of the foregoing methods of operating a gas turbine engine, the mid-span shroud has an elliptical cross section with a minor axis that varies along the length of the mid-span shroud.

BRIEF DESCRIPTION OF THE DRAWINGS

FIG. 2 is a cross-sectional view of a fan.

FIG. 3 is a cross-sectional view of a mid-span shroud taken along line AA of FIG. 2.

FIG. 4 is a cross-sectional view of a fan blade of FIG. 2 taken along line BB of FIG. 2.

FIG. 5 is a cross-sectional view of another example fan blade taken along line BB of FIG. 2.

DETAILED DESCRIPTION

Figure 1:
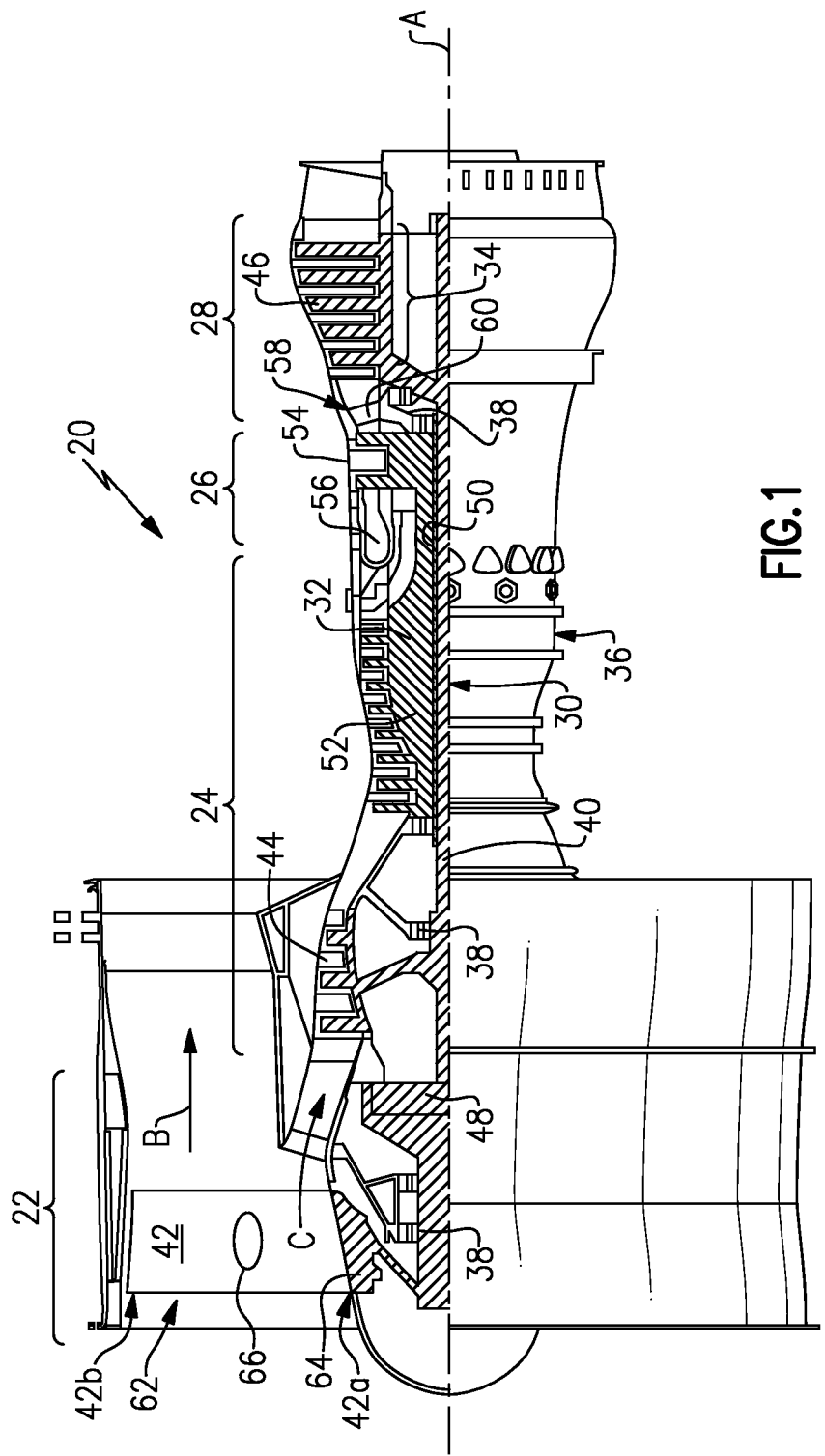
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 62 and a low pressure (or first) compressor section 44 to a low pressure (or first) turbine section 46. The inner shaft 40 drives the fan 62 through a speed change device, such as a geared architecture 48, to drive the fan 62 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle. In one non-limiting embodiment, the low pressure turbine 46 includes at least three stages and no more than 6 stages. In another non-limiting embodiment, the low pressure turbine 46 includes at least three stages and no more than 4 stages.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Air flowing through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }° R)/(518.7° R)]^{0.5}$. The "Low corrected fan tip speed", as disclosed herein according to one non-limiting embodiment, is less than about 1150 ft/second.

The example gas turbine engine includes the fan 62 that comprises in one non-limiting embodiment less than about 26 fan blades 42. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 in FIG. 1 includes fan blades 42 that extend from a central disk 64 on a radially inner end 42*a* to a free radially outer end 42*b*. In this example, a mid-span shroud 66 extends substantially perpendicularly from the fan blade 42 at approximately seventy percent of the distance from the axis A of the turbine engine 20 to the radially outer end of the fan blade 42.

Turning to FIG. 2, the mid-span shroud 66 includes a first shroud member 68 on a first side of the fan blade 42 and a second shroud member 70 on a second opposite side of the fan blade 42. The first shroud member 68 includes a first bearing face 72 on a distal end and the second shroud member 70 includes a second bearing face 74 on a distal end. The first bearing face 72 and the second bearing face 74 are sized to withstand the reaction forces from adjacent fan blades 42 during operation of the gas turbine engine 20. The first and second shroud members 68 and 70 contact each other at approximately the midpoint between adjacent fan blades 42.

The first and second shroud members 68 and 70 have an elliptical cross section (FIG. 3). In this example, the major axis 78 remains substantially constant along the length of the first and second shroud members 68 and 70, and the minor axis 76 decreases between the fan blade 42 and the distal ends of the first and second shroud members 68 and 70. The cross-sectional area of the mid-span shroud 66 generally decreases between opposing ends of the mid-span shroud 66. For example, the cross-sectional area of the second bearing face 74 is greater than the cross-sectional area taken along line AA in FIG. 2. A distance from a center 80 of the mid-span shroud 66 to the axis A varies in the radial direction along the length of the mid-span shroud 66. The length of the major and minor axes 70 and 68 is varied to reduce drag. The first and second bearing faces 72 and 74 are sized to withstand reaction forces between adjacent fan blades 42.

In this example, the fan blade 42, the first shroud member 68, and the second shroud member 70 are made of aluminum or titanium. The first shroud member 68 and the second shroud member 70 are integrally formed with the fan blade 62 (FIG. 4). In another example, the first shroud member 68 and the second shroud member 70 are formed separately from the fan blade 42 and are bonded to the fan blade 42 with an adhesive or metallurgical bond (FIG. 5). The mid-span shroud 66 in FIG. 5 has a larger cross-sectional area at the fan blade 42 than the cross-sectional area of the mid-span shroud 66 at the fan blade 42 in FIG. 4 to provide increased bonding surface.

Due to the geared architecture 48, the fan 62 rotates at a slower speed than the low pressure turbine 46. Because the fan 62 has a lower rotational speed, the fan blade velocity decreases and the aerodynamic losses that would normally accompany a mid-span shrouded fan are reduced. The gas turbine engine 20 generates a similar amount of thrust as a gas turbine engine with a fan section that rotates at the same speed as the low pressure turbine by increasing the length and number of fan blades 42 due to the increased strength from the mid-span shroud 66. The fan 62 accommodates more fan blades 42 by decreasing the chord width of the fan blades 42 to allow for more fan blades 42. Increasing the length and number of fan blades 42 and decreasing the chord width of the individual fan blades 42 will decrease the overall weight of the gas turbine engine 20 as well as the rotating mass.

Figure 6:
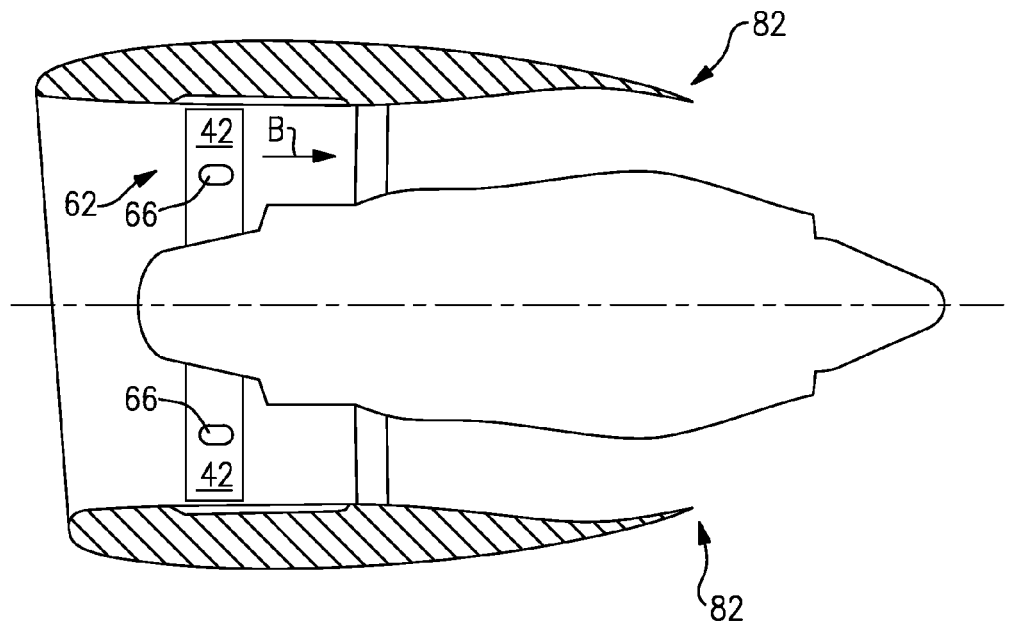
FIG. 6 is a partial cross-sectional view of a fixed area fan nozzle.

In one non-limiting embodiment, the fan nozzle 82 includes a fixed area fan nozzle such that the exit area for the fan section 22 is fixed during operation of the gas turbine engine 20 (FIG. 6). Eliminating a variable area fan nozzle from the gas turbine engine 20 provides a significant weight loss over convention gas turbine engines with variable area fan nozzles. A variable area fan nozzle can be eliminated from the gas turbine engine 20 because of: (i) the gas turbine engine's 20 ability to prevent flutter through the use of the shroud 66; and (ii) the lower rotational speed of the fan 62 due to the geared architecture 48.

Figure 7:
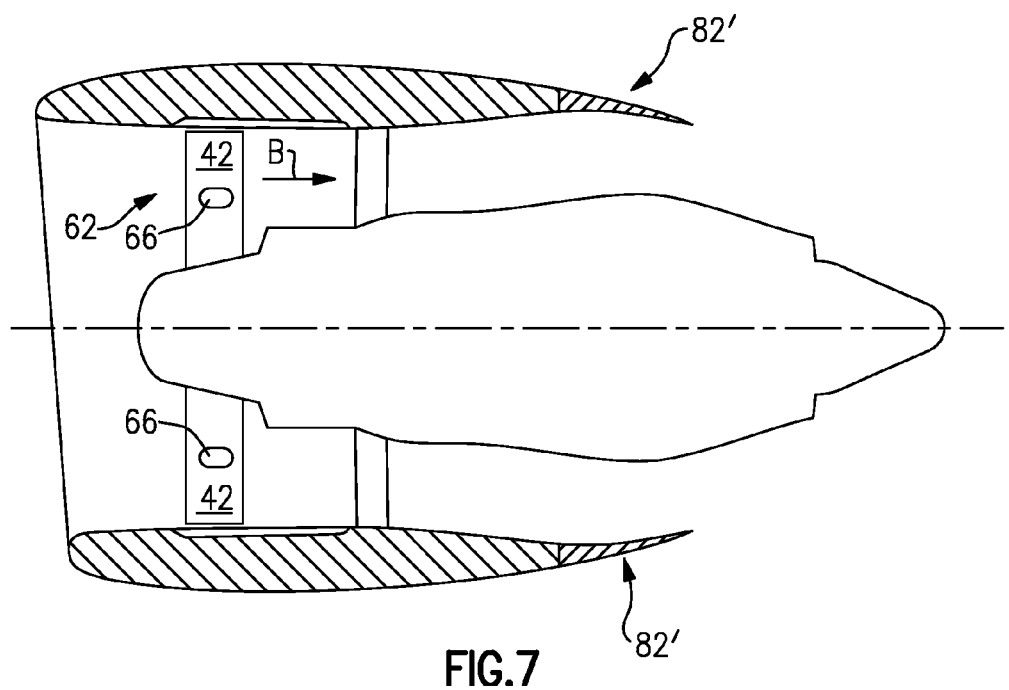
FIG. 7 is a partial cross-sectional view of a variable area fan nozzle

In another non-limiting embodiment, a fan nozzle 82' includes a variable area fan nozzle such that the exit area of the fan section 22 is varied during operation of the gas turbine engine 20 (FIG. 7). Increasing the exit area of the fan section in addition to the mid-span shroud 66 will prevent flutter of the fan blades 42 from occurring by decreasing the pressure downstream of the fan blades 42.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a fan section including a fan with a plurality of fan blades rotatable about an axis, each of the plurality of fan blades includes a mid-span shroud including a first shroud member having a first bearing surface on a first side of each of the plurality of fan blades and a second shroud member having a second bearing surface on a second opposite side of each of the plurality of fan blades, wherein the first shroud member includes an elliptical cross section having a first minor axis at a mid-portion of the first shroud member that is smaller than a second minor axis adjacent the first bearing surface; and
a speed change device in communication with the fan.

2. The gas turbine engine of claim 1, wherein the mid-span shroud is spaced inwardly from opposing ends of the plurality of fan blades.

3. The gas turbine engine of claim 1, wherein a major axis of the elliptical cross section is substantially constant along a length of the mid-span shroud.

4. The gas turbine engine of claim 1, wherein a distance between a center of the elliptical cross-section and the axis varies along a length of the mid-span shroud.

5. The gas turbine engine of claim 1, wherein a cross-sectional area of at least one of the first shroud member and the second shroud member decreases between opposing ends.

6. The gas turbine engine of claim 1, including a low pressure turbine with at least three stages and no more than six stages.

7. The gas turbine engine of claim 1, including a fixed area nozzle in communication with the fan section.

8. The gas turbine engine of claim 1, wherein the second shroud member includes an elliptical cross section having a first minor axis at a mid-portion of the second shroud member that is smaller than a second minor axis adjacent the first bearing surface.

9. The gas turbine engine of claim 1, wherein the first shroud member includes a mid-portion having a cross-sectional area less than a cross-sectional area of the first bearing surface and the second shroud member includes a mid-portion having a cross-sectional area less than a cross-sectional area of the second bearing surface.

10. The gas turbine engine of claim 1, wherein at least one of the first bearing surface and the second bearing surface extend in a plane generally parallel to an axis of rotation of the gas turbine engine.

11. A fan blade for a gas turbine engine comprising:
a fan blade with a mid-span shroud including:
   a first shroud member on a first side of the fan blade having a first bearing surface, wherein the first shroud member includes a mid-portion having a cross-sectional area less than a cross-sectional area of the first bearing surface; and
   a second shroud member on a second side of the fan blade opposite from the first side having a second bearing surface, wherein the first shroud member and the second shroud member have an elliptical cross section and a distance between a center of the elliptical cross-section and an axis of rotation of the gas turbine engine varies along a length of the mid-span shroud.

12. The fan blade of claim 11, wherein the second shroud member includes a mid-portion having a cross-sectional area less than a cross-sectional area of the second bearing surface.

13. The fan blade of claim 11, wherein the first shroud member includes an elliptical cross section having a first minor axis at a mid-portion of the first shroud member that is smaller than a second minor axis adjacent the first bearing surface.

14. The fan blade of claim 13, wherein the second shroud member includes an elliptical cross section having a first minor axis at a mid-portion of the second shroud member that is smaller than a second minor axis adjacent the first bearing surface.

15. The fan blade of claim 14, wherein the cross-sectional area of the mid-portion of the first shroud member is taken in a plane parallel to an axis of rotation of the gas turbine engine.

16. A method of operating gas turbine engine, comprising the steps of:
   rotating a fan section at a first speed, wherein the fan section includes at least one fan blade having a first mid-span shroud member on a first side of the at least one fan blade having a first bearing surface and a second mid-span shroud member on a second opposite side of the at least one fan blade having a second bearing surface, wherein the first shroud member includes an elliptical cross section having a first minor axis at a mid-portion of the first shroud member that is smaller than a second minor axis adjacent the first bearing surface; and
   rotating a turbine section at a second speed, wherein the first speed is different from the second speed.

17. The method as recited in claim 16, wherein a speed change device is in mechanical communication with the fan section and the turbine section.

18. The method of claim 16, wherein the second shroud member includes an elliptical cross section having a first minor axis at a mid-portion of the second shroud member that is smaller than a second minor axis adjacent the second bearing surface.

19. The method of claim 16, wherein the first shroud member includes a mid-portion having a cross-sectional area less than a cross-sectional area of the first bearing surface.

20. The method of claim 19, wherein the second shroud member includes a mid-portion having a cross-sectional area less than a cross-sectional area of the second bearing surface.

* * * * *